United States Patent
Stasik et al.

(10) Patent No.: US 7,344,474 B2
(45) Date of Patent: *Mar. 18, 2008

(54) CONTROL FOR SELECTING AUTOMATED TRANSMISSION SYSTEM SHIFT STRATEGY

(75) Inventors: Anthony Stasik, Lancashire (GB); Jeffrey P. Hawarden, Lancashire (GB)

(73) Assignee: Eaton Corporation, Cleveland, OH (US)

( * ) Notice: Subject to any disclaimer, the term of this patent is extended or adjusted under 35 U.S.C. 154(b) by 102 days.

This patent is subject to a terminal disclaimer.

(21) Appl. No.: 11/293,955

(22) Filed: Dec. 5, 2005

(65) Prior Publication Data
US 2006/0160661 A1    Jul. 20, 2006

Related U.S. Application Data

(63) Continuation of application No. 10/470,476, filed as application No. PCT/IB02/00291 on Jan. 31, 2002, now Pat. No. 6,997,849.

(30) Foreign Application Priority Data
Feb. 1, 2001    (GB)    ................................... 0102510

(51) Int. Cl.
*B60W 10/00*    (2006.01)
(52) U.S. Cl. ........................................................ 477/78
(58) Field of Classification Search .................. 477/70, 477/78, 79, 80, 83, 84, 86
See application file for complete search history.

(56) References Cited

U.S. PATENT DOCUMENTS 6,997,849 B2 *    2/2006    Stasik et al. .................... 477/78

* cited by examiner

*Primary Examiner*—Dirk Wright
(74) *Attorney, Agent, or Firm*—Rader, Fishman & Grauer PLLC

(57) ABSTRACT

A control for an automated mechanical transmission system (10) including, an automated master clutch (20/39). The system controller (46) will sense vehicle operating conditions (54) to command the most appropriate of dynamic shifts performed with the master clutch engaged or dynamic shifts performed by disengaging and then re-engaging the master clutch.

20 Claims, 6 Drawing Sheets

CONTROL FOR SELECTING AUTOMATED TRANSMISSION SYSTEM SHIFT STRATEGY

RELATED APPLICATIONS

This application is a continuation of copending U.S. application Ser. No. 10/470,476, assigned to Eaton Corporation, assignee of this application, the contents of which are incorporated by reference herein in their entirety.

BACKGROUND

1. Field of the Invention

The present invention relates to control for an automated mechanical transmission system and in particular to a control for selecting, as a function of sensed system operating parameters, either (i) a shift sequence involving master clutch disengagement or (ii) a shift sequence not involving master clutch disengagement, in an automatic mechanical transmission system including an automated master friction clutch.

2. Description of the Prior Art

Automate mechanical transmission systems (i.e., systems having transmissions wherein gear ratios are engaged and disengaged by jaw clutches) having automated master clutch operators are known in the prior art as may be seen by reference to U.S. Pat. Nos. 4,081,065; 4,361,060; 4,648,290; 4,936,428; 5,960,916; 5,947,847; and 5,634,867, the disclosures of which are incorporated herein by reference. Automated mechanical transmission systems not having an automatic master clutch actuator and requiring manual master clutch operation, usually only to launch the vehicle, are also known in the prior art as may be seen by reference to U.S. Pat. Nos. 6,145,399; 5,582,558; 6,146,310; 5,272,939; 5,335,566; and 5,425,689, the disclosures of which are incorporated herein by reference.

The prior art automated transmissions systems not having an automated master clutch actuator, by necessity, utilized a shift sequence for dynamic automatic shifting not requiring disengagement of the vehicle master clutch. Typically, engine fueling was controlled to relieve torque lock, allowing a shift from a previously engaged ratio into neutral and then the engine was caused to rotate at a substantially synchronous speed for engaging a target ratio, all with the master clutch remaining engaged. Systems of this type may be seen by reference to U.S. Pat. Nos. 4,850,263; 5,820,104; 4,593,580; 5,582,558; 6,126,570; and 6,145,399, the disclosures of which are incorporated herein by reference.

The prior art automated mechanical transmission systems having an automated master clutch actuator tended to utilize a shift strategy or sequence for all dynamic shifts which included disengaging and then re-engaging the master friction clutch at least once during each shift, regardless if that shift could have been acceptably and/or preferably performed without disengaging and re-engaging the master clutch.

SUMMARY

In accordance with the present invention, the drawbacks of the prior art, automated mechanical transmission systems are minimized by providing a control for an automated mechanical transmission system having an automated master clutch operator which, on a shift-by-shift basis, and as a function of sensed vehicle operating conditions, will determine if (i) a shift strategy retaining the master clutch engaged or (ii) a shift strategy involving disengaging and re-engaging the master clutch, is most appropriate for a dynamic shift from an existing gear ratio into a target gear ratio.

Accordingly, it is an object of the present invention to provide a new and improved automated mechanical transmission system having automatic master clutch operator which will evaluate and implement the most effective of (i) a shift sequence retaining the master clutch engaged and (ii) a shift sequence involving disengaging and then re-engaging the master clutch, for dynamic shifts from an engaged ratio into a target gear ratio.

This and other objects and advantages of the present invention will become apparent from a reading of the following description of the preferred embodiment taken in connection with the attached drawings.

DETAILED DESCRIPTION

Figure 1:
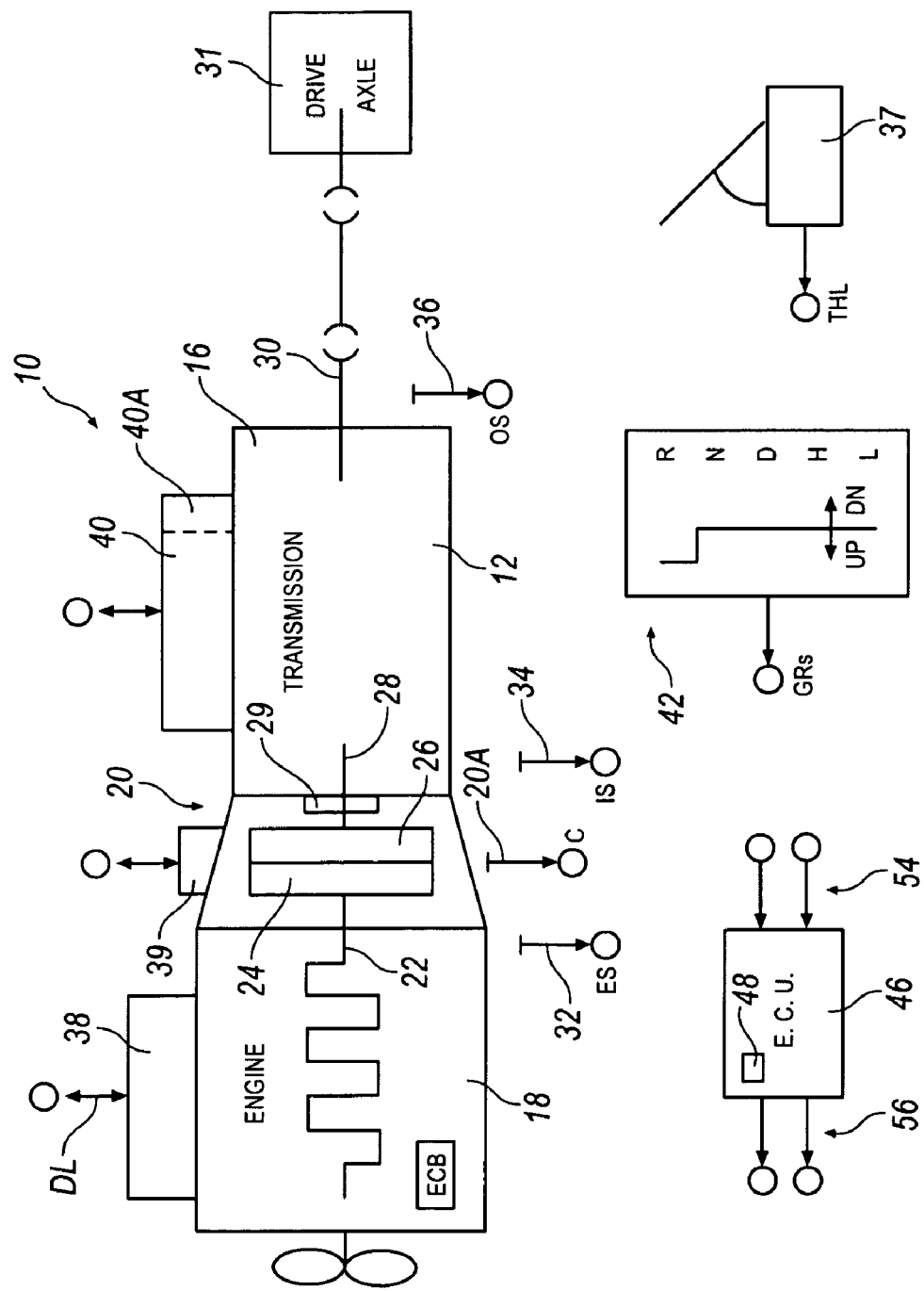
FIG. 1 is a schematic illustration of a vehicular drivetrain using an automated mechanical transmission system including an automatic master clutch operator.

An automated vehicular drivetrain system 10 using the shift sequence selection control technique of the present invention is schematically illustrated in FIG. 1. In system 10, a change-gear transmission 12 comprising an automatically shifted main transmission section 14 connected in series with a splitter-type auxiliary transmission section 16 is drivingly connected to an internal combustion engine 18, such as a well-known gasoline or diesel engine, by an automatically operated master friction clutch 20. Preferably, auxiliary transmission section 16 is of the three-layer, four-speed combined splitter/range type, as illustrated in U.S. Pat. Nos. 4,754,665 and 5,390,561, the disclosures of which are incorporated herein by reference.

Engine 18 includes a crankshaft 22, which is attached to a driving member 24 of master clutch 20, which is normally frictionally engaged with a driven member 26, which is attached to the input shaft 28 of the transmission. A transmission output shaft 30 extends from the auxiliary transmission section 16 for driving connection to the vehicular drive wheels, as through a drive axle 31 or the like. For purposes of illustration, transmission 12 is illustrated as a (2+1).times.(2).times.(−2) type transmission providing nine or ten selectable forward ratios. Transmissions of this general type are well known in the prior art and are sold by the assignee of this application, EATON CORPORATION, under the trademark "Super-10" and may be seen in greater detail by reference to U.S. Pat. Nos. 6,015,366; 5,974,906; and 5,974,354, the disclosures of which are incorporated herein by reference.

An inertia or input shaft brake 29 may be provided to selectively retard the rotational speed of input shaft 28. The engine may also include an engine brake device such as engine compression brake ECB.

Transmission system 10 further includes rotational speed sensors 32 for sensing engine rotational speed (ES), 34 for sensing input shaft rotational speed (IS), and 36 for sensing output shaft rotational speed (OS), and providing signals indicative thereof. A sensor 37 provides a signal THL indicative of throttle pedal position. The signal is usually a percentage (0% to 100%) of fuel throttle position. Engine 18 may be electronically controlled, including an electronic controller 38 communicating over an electronic data link (DL) operating under an industry standard protocol such as SAE J-1922, SAE J-1939, ISO 11898 or the like. An automated actuator 39 may be utilized to selectively engage and disengage normally engaged master clutch 20, as is well known in the prior art. A sensor 20A maybe provided to sense the condition of clutch 20 and to provide a signal C indicative thereof.

Clutch controller 39 may be of any known type, such as a piston operated device, a ball ramp operated device or the like, see for example U.S. Pat. Nos. 4,081,065; 4,361,060; 4,865,173; 5,964,330; and 6,022,295.

A shift actuator 40 is provided to control shifting of the transmission sections. Shift actuator 40 is preferably an X-Y shift actuator, which by way of example may be of the types illustrated in U.S. Pat. Nos. 5,481,170; 5,281,902; 4,899,609; and 4,821,590. Actuator 40 will preferably include a position sensor 40A operable to sense the X-Y position of a shift member and to provide signals indicative thereof. X-Y position sensors are known in the prior art and examples thereof may be seen by reference to U.S. Pat. Nos. 5,743,143; 5,894,758; 5,950,491; and 5,911,787, the disclosures of which are incorporated herein by reference A shift selector 42 provides a signal GRs of the mode of operator selected by the operator. System 10 includes a control unit, preferably a microprocessor-based control unit 46 of the type illustrated in U.S. Pat. Nos. 4,595,986; 4,361,065; and 5,335,566, the disclosures of which are incorporated herein by reference, for receiving input signals 54 and processing same according to predetermined logic rules to issue command output signals 56 to system actuators, such as engine controller 38, clutch actuator 39, auxiliary section shift actuator 40, and the like. Control unit 46 may include a timing circuit or clock 48.

Figure 1A:
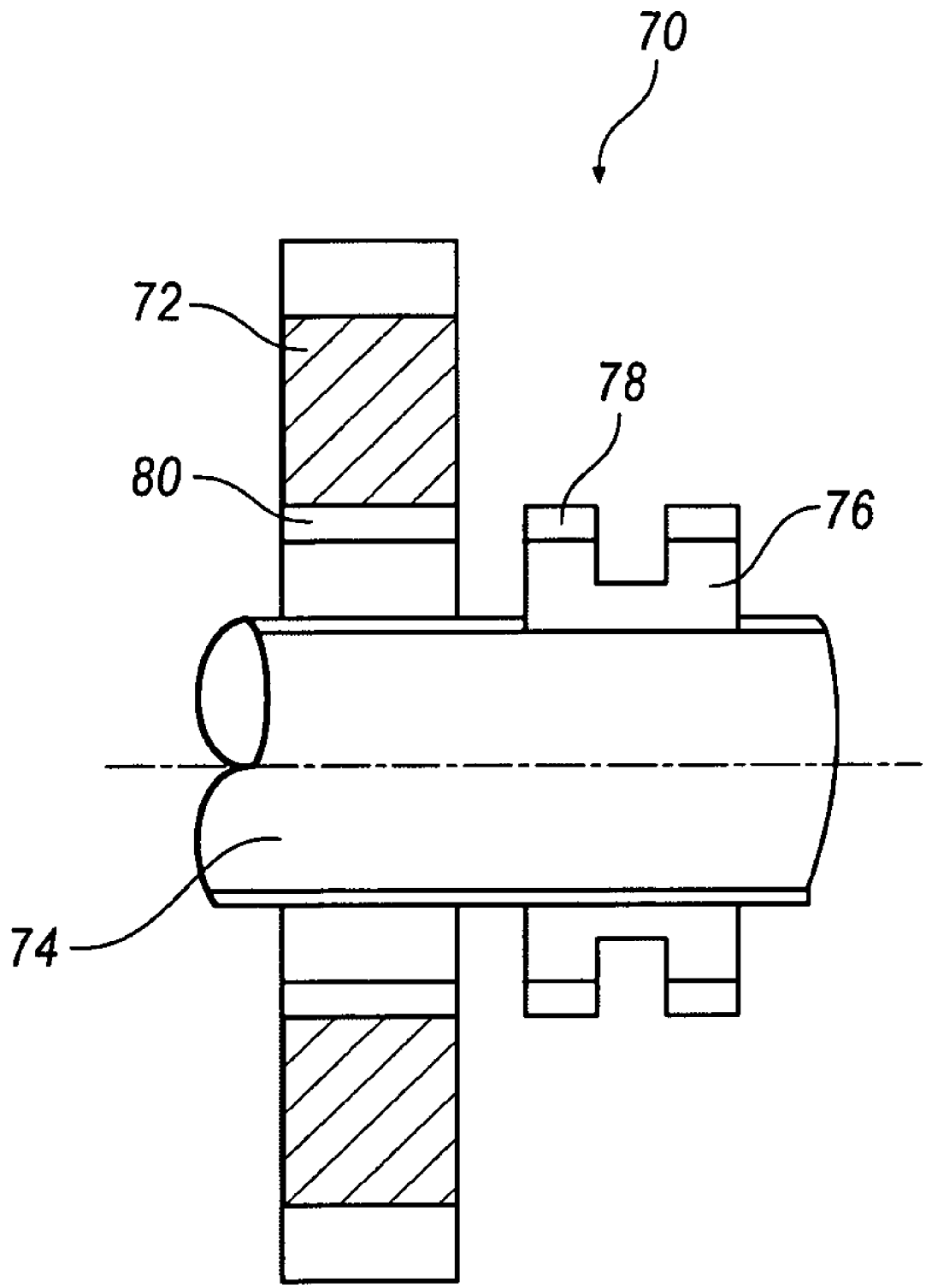

FIG. 1A illustrates a typical jaw clutch assembly 70 for selectively engaging and disengaging a gear 72 to a shaft 74, such as a transmission main shaft, for engaging and disengaging a transmission ratio. Briefly, jaw clutch member 76 is splined to shaft 74 for axial movement relative thereto and rotation therewith. Jaw clutch member 76 carries external clutch teeth 78 for engaging internal clutch teeth 80 formed in the inner diameter bore of gear 72. The jaw clutch member 76 is axially positioned by a shift fork (not shown) or the like. The shift fork is typically axially positioned by a shift rail, a shift shaft, a ball ramp or ball screw, a piston, or a functionally similar device.

As is known, to disengage a jaw clutch in a vehicular mechanical transmission, especially in a heavy-duty vehicle, it is necessary to relieve torque lock at the engaged jaw clutch. If opening the master clutch 20 is not desirable, torque lock can be relieved by fueling the engine to cause assumed zero driveline torque and/or by forcing torque reversals which will positively cause crossings of zero driveline torque.

Fully or partially automated mechanical transmission systems that, upon determining that a dynamic shift from a currently engaged ratio into neutral and then into a target ratio is desirable, will, while maintaining the vehicle master friction clutch engaged, initiate automatic fuel control to cause reduced torque across the jaw clutches to be disengaged, are known in the prior art as may be seen by reference to U.S. Pat. Nos. 4,850,236; 5,820,104; 5,582,558; 5,735,771; 5,775,639; 6,015,366; and 6,126,570, the disclosures of which are incorporated herein by reference. These systems include systems that attempt to fuel the engine to achieve a sustained zero driveline torque, and systems that force torque reversals, see U.S. Pat. No. 4,850,236. These systems, upon sensing a neutral condition, will, while maintaining the master clutch engaged, cause the engine to rotate at a speed determined to cause synchronous conditions for engaging the target ratio.

Control of engine torque to achieve a desired output or flywheel is known as and may be seen by reference to U.S. Pat. No. 5,620,392, the disclosure of which is incorporated herein by reference.

Engine torque as used herein refers to a value indicative of an engine torque, usually gross engine torque, from which an output or flywheel torque may be calculated or estimated. The relationship of gross engine torque to flywheel torque is discussed in U.S. Pat. Nos. 5,509,867 and 5,490,063, the disclosures of which are incorporated herein by reference.

One or more engine torque value may be commanded on, or read from, and industry standard data line, DL, such as SAE J-1922, SAE J-1939 or ISO11898 compliant datalink.

According to one embodiment of the present invention, upon sensing that a shift from an engaged ratio to neutral, without disengaging the master clutch 20, is required, the engine is first commanded to ramp to a value of engine torque determined or calculated, based upon sensed system operating parameters, to correspond to zero driveline torque.

Figure 3:
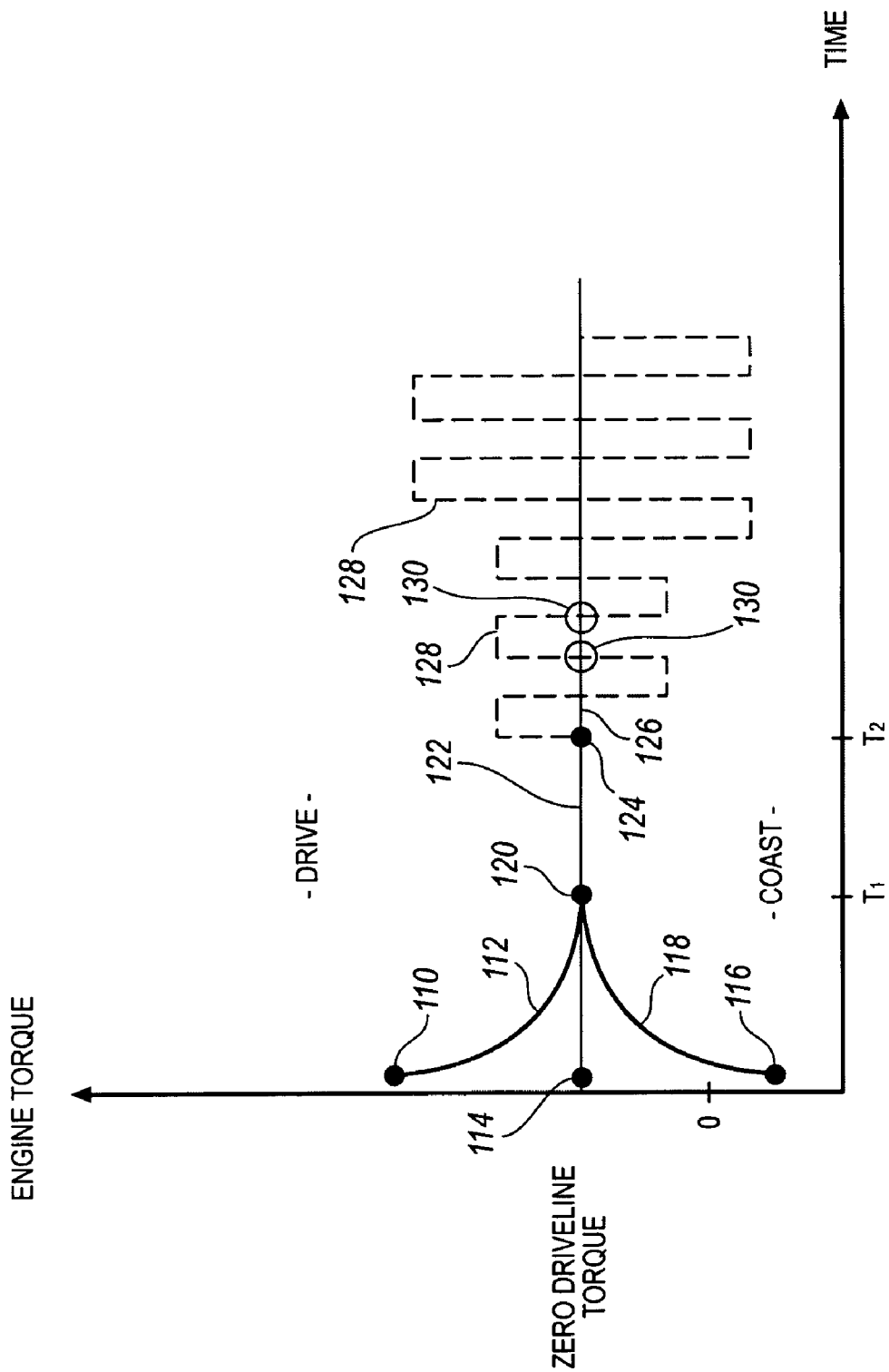
FIG. 3 is a schematic illustration of a preferred engine control sequence for relieving torque lock in a shift sequence retaining the master clutch engaged.

Referring to FIG. 3, if the shift initiates at a drive condition 110, the engine torque will be commanded to ramp down 112 to the calculated value 114 assumed to correspond to the zero driveline torque condition. Similarly, if the shift to neutral initiates at a coast condition 116, the engine torque will be commanded to ramp up 118 to the calculated value 114. Preferably, the slope of the ramps 112 and 116 (i.e., the rate of change of engine torque) will be functions of the ratio being disengaged and/or current throttle position THL. Upon achieving the assumed zero driveline torque condition 120 (at time T,) the engine will be commanded to remain at this condition 122 for a period of T time (T.sub.2−T.sub.1). The period of time (T.sub.2−.sub.1) is typically about 150-300 milliseconds. At expiration of that period of time 124, the sensed velocity of a shift member, such as for example, a shift fork or shift finger, is compared to a reference value REF. If the shift member velocity equals or exceeds the reference value ((d/dt(SL.sub.Y−Y))>REF), this indicates that the shift member is moving at a rate towards jaw clutch disengagement indicative of non-torque lock conditions and a torque bump routine is not necessary or desirable. In such conditions, the engine will be commanded to continue generating an output torque assumed to correspond to zero driveline torque (solid line 126) until transmission neutral is sensed.

If the sensed shift member velocity does not equal or exceed the reference value ((d/dt(SL.sub.Y−Y)<REF), than torque lock conditions may exist and a torque bump fueling routine of the engine (dashed lines 128) to forced torque reversals (130) at the jaw clutch will commence until neutral is sensed and/or a time period expires. The magnitude and/or shape of the torque bumps 128 may vary with time.

As may be seen, system 10 has the ability to perform dynamic shifts either by a sequence not involving disengaging and the re-engaging the master clutch or by a sequence wherein the master clutch is disengaged and then re-engaged.

Prior art automated systems with automatic clutch actuators tended to do all dynamic shifting utilizing the master clutch or all dynamic shifting without utilizing the master clutch. Dynamic shifting without use of the master clutch is generally desirable as no wear to the clutch components occurs and shift quality is generally better than shifting with master clutch disengaging and re-engaging. However, under certain vehicle operating conditions, such as when shifting in low gears on gradients, using the master clutch can reduce shift times and assure that synchronous conditions can be reached in a reasonable time.

Figure 2:
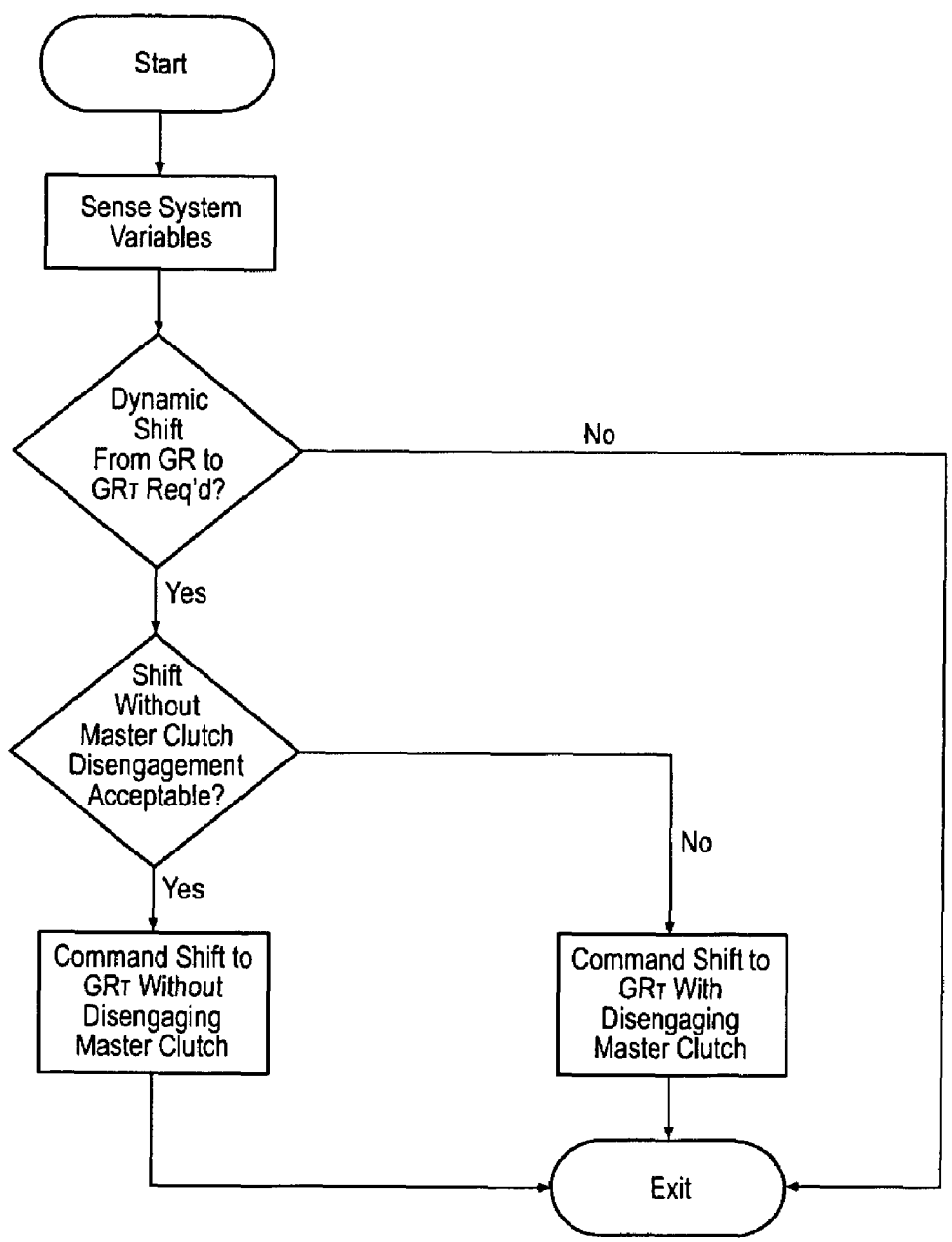
FIG. 2 is a schematic illustration, in flow chart format, of the control of the present invention.

According to the present invention, the system 10 decides, shift-by-shift which dynamic shift strategy is appropriate to current vehicle operating conditions. In a preferred embodiment, shifting with the master clutch remaining engaged is the preferred shift strategy, and will be implemented unless the system senses the existence of conditions indicating the need for a master clutch disengagement/re-engagement type shift. If such conditions are sensed, a master clutch disengagement/re-engagement shift sequence will be commanded, see flowchart of FIG. 2.

There are various operating conditions which call for dynamic shifting using master clutch disengagement. When in a "low ratio", which is a high ratio of input shaft speed to output shaft speed, and traveling up a grade, it may be difficult to cause a zero driveline torque if the grade is steep and it may also be difficult to decelerate the engine quickly enough to cause substantially synchronous conditions for engaging the jaw clutch associated with a relatively low gear ratio. This may even be true if an engine brake, ECB, is utilized. In such situations, disengaging the clutch will assure a torque break for shifting to neutral and by engaging the jaw clutch first and then the master clutch, the slip of the master clutch will allow a considerably wider synchronous window for engaging the target ratio (GR.sub.T) than will the backlash of a jaw clutch.

Further, with the master clutch disengaged, an inertia brake 29 will have a much greater decelerating effect on the input shaft for quicker upshifting. Further, if the torque reversal technique, line 128 in FIG. 3, does not result in a rapid shift to neutral, the control may then cause nominal engine output torque and a brief master clutch disengagement.

It is noted that, in certain operating conditions, engine brakes, such as engine compression brakes, may be somewhat ineffective to cause sufficiently rapid engine deceleration and/or may be somewhat slow to respond. Accordingly, if an extremely rapid torque interruption and/or input shaft deceleration is required, a shift strategy using master clutch disengagement is preferred.

The clutch actuator 39 will be used to engage clutch 20 in a modulated manner to launch the vehicle from stop, as well as providing the ability to do dynamic shifting in a shift sequence involving disengagement and re-engagement of the master clutch. Examples of clutch controls for vehicle launch may be seen by reference to U.S. Pat. Nos. 4,081,065; 5,314,050; 5,404,301; 5,630,713; and 5,643,867. Dynamic shifting refers to shifting while the vehicle is moving, usually in the forward direction, and the clutch has been fully engaged. A typical up-shift sequence utilizing the master clutch will involve (i) disengaging the master clutch to break torque, (ii) shifting from engagement of gear ratio GR into neutral, (iii) decelerating the input shaft toward a substantially synchronous speed, (iv) engaging the jaw clutch associated with the target gear ratio GR.sub.T, and (v) re-engaging the master clutch as engine speed falls within a relatively wide window of synchronous engine speed.

Figure 4A:
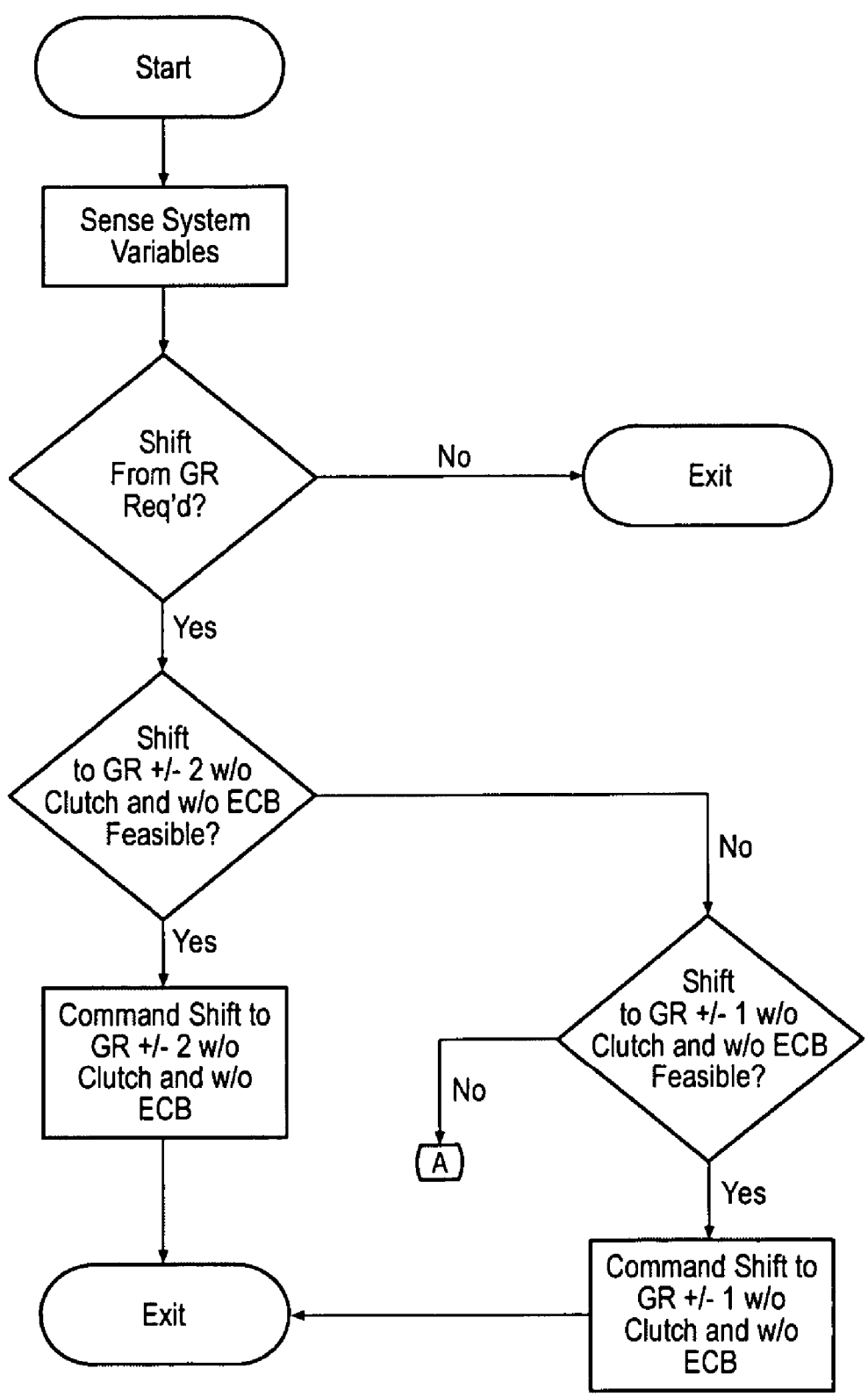
FIGS. 4A and 4B are schematic illustrations, in flow chart formats of an alternate embodiment of the present invention.
Figure 4B:
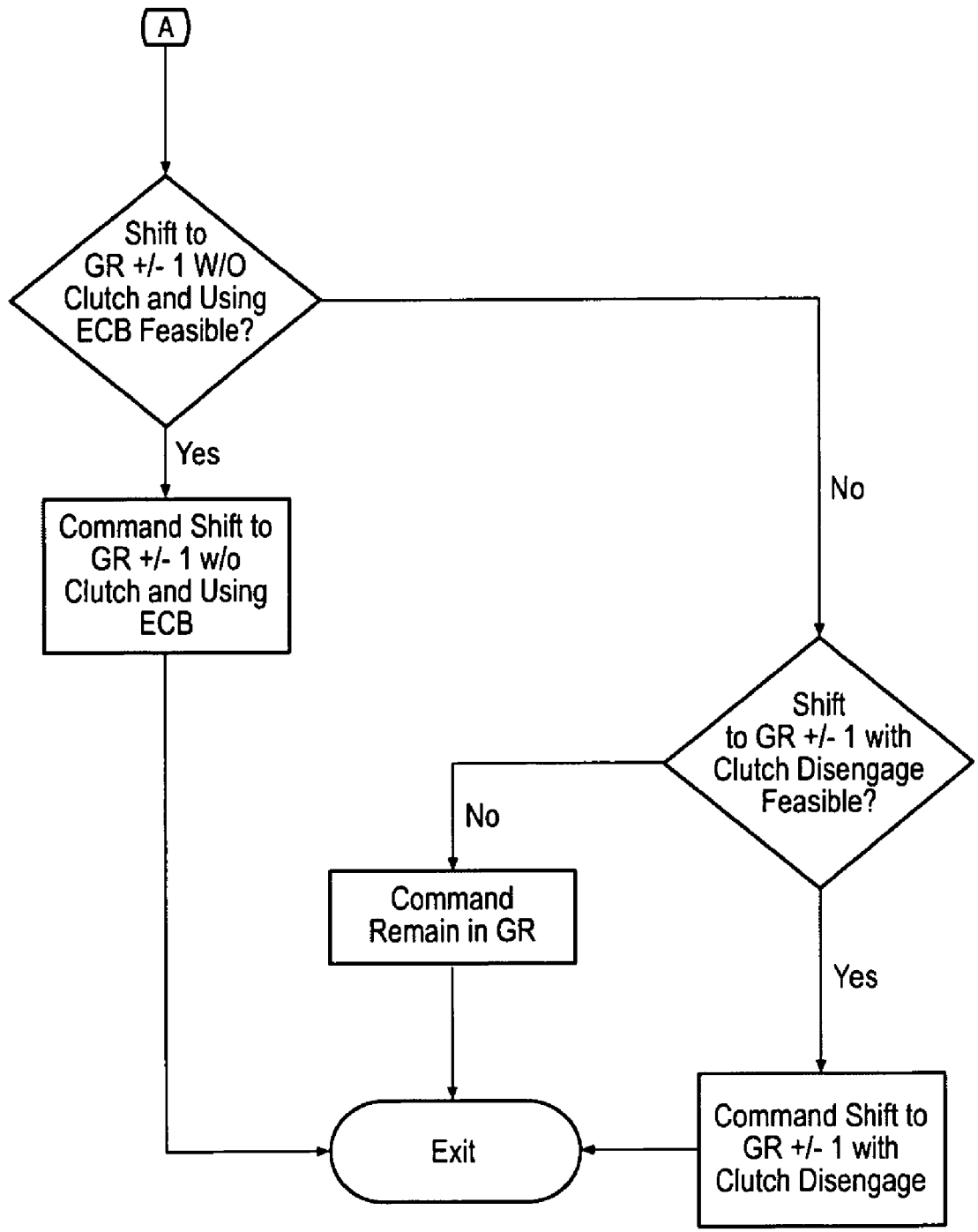

Logic for evaluating the feasibility of a particular shift and/or for identifying the most desirable target gear ratio (GR.sub.T) in automated mechanical transmission systems is known in the prior art, see U.S. Pat. Nos. 5,272,939; 5,335,566; 5,533,946; 6,066,071; 6,146,310; and 6,149,545, the disclosures of which are incorporated herein by reference. According to one prior art system, skip shifts without master clutch disengagement or engine braking, then single shift without master clutch disengagement but with engine braking are evaluated in sequence for feasibility, and, if feasible, initiated (see U.S. Pat. No. 6,149,545). In a preferred embodiment of the present invention, if a single shift without master clutch disengagement but with engine braking is not feasible, then a single shift with master clutch disengagement is evaluated for feasibility, and, if feasible, initiated (see FIGS. 4A and 4B).

Accordingly, it may be seen that a new and improved transmission system and shift selection strategy therefore, is provided.

Although the present invention has been described with a certain degree of particularity, it is understood that the description of the preferred embodiment is by way of example only and that numerous changes to form and detail are possible without departing from the spirit and scope of the invention as hereinafter claimed.

The invention claimed is:

1. A method for controlling automatic upshifting in a vehicular automated mechanical transmission system comprising a fuel-controlled engine, an input shaft deceleration device, multiple-speed mechanical transmission, a master clutch and a controller for receiving input signals including one or more of signals indicative of engine speed, engine torque, transmission engaged gear ratio, operator throttle setting and vehicle speed, and to process said input signals in accordance with logic rules to issue command output signals to transmission system actuators including a transmission actuator effective to shift said transmission, an input shaft deceleration device actuator effective to operate said input shaft deceleration device, and a clutch actuator effective to engage and disengage said master clutch, the method comprising the steps of:

establishing an upshift feasibility criteria for determining feasibility of upshifts into a target gear ratio ($GR_T$); and performing at least one of the following steps upon sensing a requirement for an upshift from an engaged gear ratio (GR):

(a) determining if a single upshift without use of said input shaft decelerating device and without disengaging the master friction clutch is feasible and, if feasible, commanding a single upshift from the currently engaged ratio without using said input shaft decelerating device and without disengaging the master friction clutch;

(b) determining if a single upshift using said input shaft decelerating device and without disengaging the master friction clutch is feasible and, if feasible, commanding a single upshift from the currently engaged ratio using said input shaft decelerating device and without disengaging the master friction clutch;

(c) determining if a single upshift with disengaging the master friction clutch is feasible and, if so, commanding a single upshift from the currently engaged ratio with disengaging the master friction clutch; and (d) retaining the transmission engaged in the currently engaged ratio.

2. The method of claim 1, wherein said input shaft decelerating device is an engine brake.

3. The method of claim 1, wherein the criteria includes the requirement that substantial synchronization can be obtained above a predetermined engine speed.

4. The method of claim 1, wherein the criteria includes the requirement that at engagement of the target ratio, the vehicle will be capable of at least a predetermined minimum vehicle acceleration.

5. The method of claim 1, wherein the criteria includes the requirement that upshifts into a target gear ratio be completed within a predetermined maximum period of time.

6. The method of claim 1, further comprising the step of commanding the engine to ramp to a value of driveline torque that corresponds to about zero driveline torque.

7. The method of claim 1, wherein said step of performing includes determining whether a single upshift without disengaging the master clutch and with engine braking is feasible.

8. The method of claim 1, wherein all steps of determining are performed.

9. A method for controlling automatic upshifting in a vehicular automated mechanical transmission system comprising a fuel-controlled engine, a multiple-speed mechanical transmission, a master friction clutch and a controller for receiving input signals including one or more of signals indicative of engine speed (ES), engine torque, transmission engaged gear ratio (GR), operator throttle setting (THL) and vehicle speed (OS), and to process said input signals in accordance with logic rules to issue command output signals to transmission system actuators including a transmission actuator effective to shift the transmission and a clutch actuator effective to engage and disengage the master friction clutch, the method comprising the steps of:
 establishing an upshift feasibility criteria whereby upshifts into a target gear ratio ($GR_T$) are considered feasible only if, under sensed vehicle operating conditions, predetermined conditions are satisfied; and
 performing at least one of the following steps upon sensing a requirement for an upshift from an engaged gear ratio (GR):
  (a) determining if a single upshift without disengaging the master friction clutch is feasible and, if feasible, commanding a single upshift from the currently engaged ratio without disengaging the master friction clutch;
  (b) determining if a single upshift with disengaging the master friction clutch is feasible and, if so, commanding a single upshift from the currently engaged ratio with disengaging the master friction clutch, if not,
  (c) retaining the transmission engaged in the currently engaged ratio.

10. The method of claim 9, wherein the criteria includes the requirement that substantial synchronization can be obtained above a predetermined engine speed.

11. The method of claim 9, wherein the criteria includes the requirement that at engagement of the target gear ratio, the vehicle will be capable of at least a predetermined minimum vehicle acceleration.

12. The method of claim 9, wherein the criteria includes the requirement that upshifts into a target gear ratio be completed within a predetermined maximum period of time.

13. The method of claim 9, wherein at least one of said steps of determining includes determining whether a single upshift without disengaging the master clutch and with engine braking is feasible.

14. The method of claim 9, wherein all steps of determining are performed.

15. The method of claim 9, wherein said step of commanding a single upshift from the currently engaged ratio without disengaging the master friction clutch includes the step of braking the engine.

16. A vehicular automated mechanical transmission system comprising:
 an automatic master clutch operator; and
 a system controller utilizing control logic, wherein said controller selectively
evaluates a shift sequence, wherein the shift sequence includes at least one of (i) retaining the master clutch engaged, and (ii) disengaging and then re-engaging the master clutch, for dynamic shifts from an engaged gear ratio into a target gear ratio.

17. The system of claim 16, wherein said controller selects at least one of the shift sequences.

18. The system of claim 17, wherein said controller selectively implements the selected shift sequence.

19. The system of claim 16, wherein said controller selectively receives input signals, wherein said input signals include signals indicative of at least one of engine speed (ES), engine torque, transmission engaged gear ratio (GR), operator throttle setting (THL) and vehicle speed (OS).

20. The system of claim 16, wherein said controller selectively issues output signals, wherein said output signals include signals indicative of at least one of engine fuel control, clutch actuator control, jaw clutch control, and engine brake control.

* * * * *